(12) United States Patent
Schmitt et al.

(10) Patent No.: US 7,375,042 B2
(45) Date of Patent: May 20, 2008

(54) WOVEN POLYESTER FABRIC FOR AIRBAGS

(75) Inventors: Thomas Edward Schmitt, Concord, NC (US); Mach A. DeBenedictis, Mooresville, NC (US)

(73) Assignee: INVISTA North America S.ar.l., Wilmington, DE (US)

( * ) Notice: Subject to any disclaimer, the term of this patent is extended or adjusted under 35 U.S.C. 154(b) by 0 days.

(21) Appl. No.: 11/863,799

(22) Filed: Sep. 28, 2007

(65) Prior Publication Data

US 2008/0014816 A1 Jan. 17, 2008

Related U.S. Application Data

(60) Provisional application No. 60/899,193, filed on Feb. 2, 2007.

(51) Int. Cl.
*D03D 15/00* (2006.01)

(52) U.S. Cl. .......................... 442/181; 442/76; 442/105

(58) Field of Classification Search ................ 442/181, 442/76, 105, 164; 280/728.1
See application file for complete search history.

(56) References Cited

U.S. PATENT DOCUMENTS

| | | | |
|---|---|---|---|
| 5,902,672 A * | 5/1999 | Swoboda et al. | 442/203 |
| 6,274,487 B1 * | 8/2001 | Suzuki | 438/653 |
| 6,294,487 B1 * | 9/2001 | Keshavaraj | 442/218 |
| 6,458,725 B1 * | 10/2002 | Masuda et al. | 442/189 |
| 6,698,458 B1 * | 3/2004 | Sollars et al. | 139/389 |
| 6,787,227 B2 * | 9/2004 | Koehnen et al. | 428/364 |
| 6,832,633 B2 * | 12/2004 | Kitamura et al. | 139/384 R |
| 7,179,762 B1 * | 2/2007 | Beasley, Jr. | 442/203 |
| 2008/0014816 A1 * | 1/2008 | Schmitt et al. | 442/76 |

* cited by examiner

*Primary Examiner*—N Edwards
(74) *Attorney, Agent, or Firm*—Craig M. Sterner

(57) ABSTRACT

The present invention relates to a woven polyester fabric for use in airbags. The present invention includes a woven fabric using a polyester filament yarn, wherein the polyester filament yarn has a tenacity of about 65 cN/tex or greater and an Instantaneous Thermal Creep (ITC) at 100° C. of about 0.5% or less. Additional embodiments of the present invention include an airbag made from the woven polyester fabric. Woven fabrics of the present invention can reduce the extent of seam combing during a hot module deployment of an airbag.

17 Claims, 2 Drawing Sheets

WOVEN POLYESTER FABRIC FOR AIRBAGS

CROSS-REFERENCE TO RELATED APPLICATION

This application claims the benefit of U.S. Provisional Application No. 60/899,193, filed Feb. 2, 2007.

FIELD OF THE INVENTION

This invention relates to a woven polyester fabric that provides an airbag with reduced edge combing. More particularly, the present invention relates to a woven fabric comprising polyester filament yarns that have low creep at elevated temperatures, and airbags made from these woven fabrics.

BACKGROUND OF THE INVENTION

Fabrics woven from polyamide filament yarns are predominately utilized in airbag manufacture due to the yarns' high energy absorption capability. This energy absorption capability is usually most easily defined as the area under the load-extension curve, and is most usually characterized by the yarn tensile index (defined as the yarn tenacity (cN/tex) times the square root of the elongation at break (%)). Energy absorption capability is particularly important due to the dynamic nature of the airbag deployment event, and previous work has been aimed at maximizing the energy absorption of polyester yarns to bring them closer to polyamides in properties.

The problem of improving the energy absorbing capability of polyester airbags has been addressed by increasing the tensile index of the polyester filament yarns used for weaving the fabrics used in the airbags. The process conditions used to manufacture these tougher yarns have been disclosed, using a high relax ratio after drawing the high tenacity yarn to increase the yarn elongation, and thus the toughness.

Airbag fabrics woven from such polyester filament yarns have failed in simulated deployment conditions. When airbag modules containing such fabrics woven from polyester filaments were preheated to about 80° C. or more, and then deployed, airbag seams pulled apart causing uncontrolled leakage of the inflator gas, a phenomenon known as fabric seam combing or fabric edge combing. These failures are not seen in airbags comprising fabrics woven from polyamide filament yarns.

In spite of attempts at solving seam combing problems, polyester airbags can still fail during a hot module deployment. In other testing of hot module deployment, the airbag module, which includes the inflator and folded airbag, was heated to 90° C. for about 4 hours prior to deployment and upon deployment the airbag failed. An exhaustive analysis of the failure mechanism in these tests indicated that failure was due to seam combing. The combined influences of inflation force, hot inflator gas, and the hot preconditioning, caused the polyester yarns at the fabric seam to stretch and to form gaps through which the gas escaped at an uncontrolled rate.

Therefore, a need exists for a woven polyester fabric that reduces the extent of seam combing in airbags and that exhibits similar characteristics as polyamide yarns when preconditioned to up to 100° C. and inflated under conditions of rapid heating and load.

SUMMARY OF THE INVENTION

In accordance with the present invention, it has now been found that a fabric woven from a polyester filament yarn can reduce the extent of seam combing during a hot module deployment. The present invention includes a woven fabric comprising a polyester filament yarn, wherein the polyester filament yarn comprises a tenacity of about 65 cN/tex or greater and an Instantaneous Thermal Creep (ITC) at 100° C. of about 0.5% or less. Additional embodiments of the present invention include a woven fabric comprising a Hot Seam Combing Index (HSCI) of about 2 or less, and an airbag manufactured from any of these woven fabrics.

DETAILED DESCRIPTION OF THE INVENTION

Figure 1:
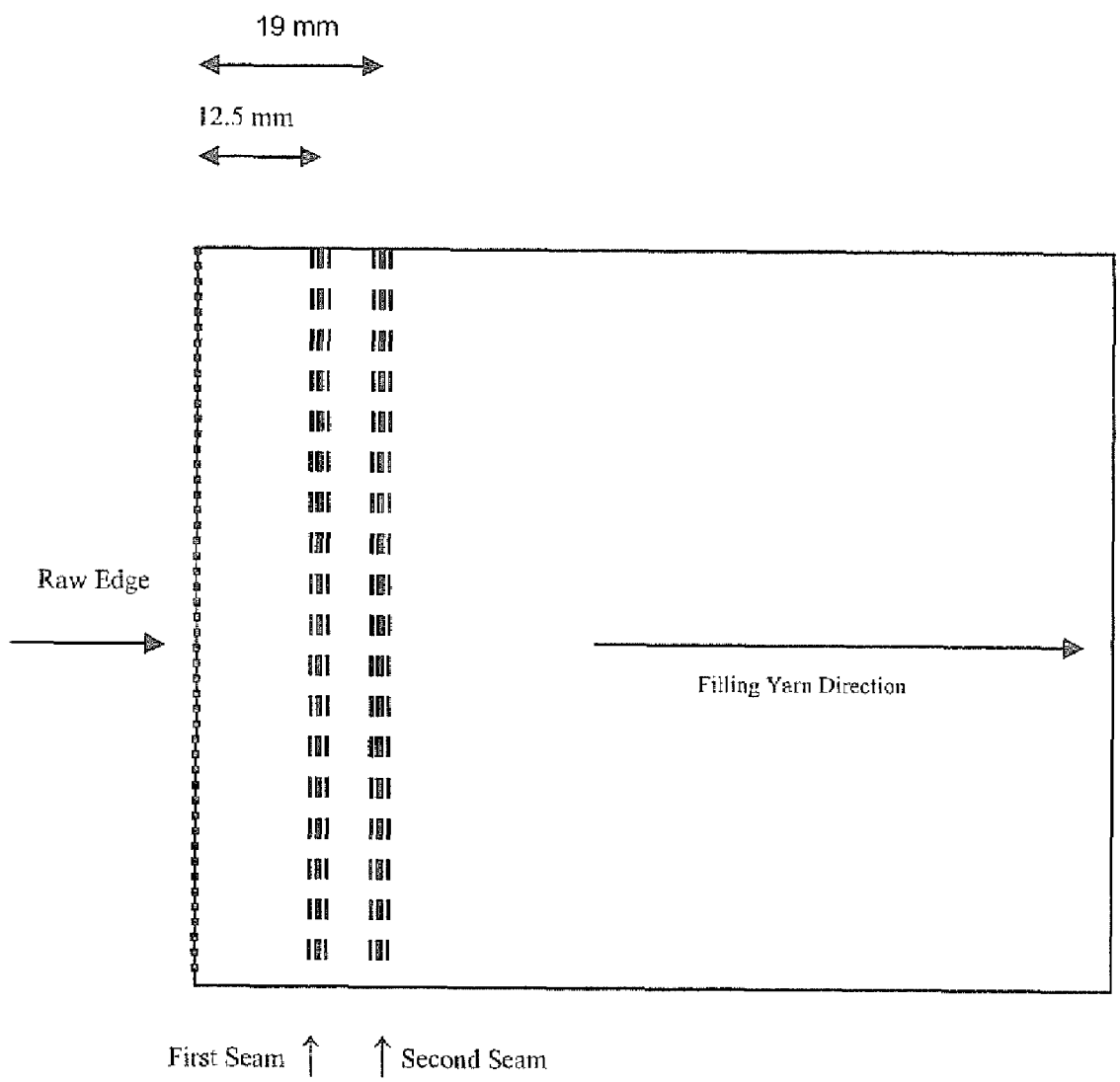
FIG. 1 illustrates the sewing pattern for the seams used to measure the HSCI.

Generally, this invention can be characterized by a woven fabric comprising a polyester filament yarn, wherein the polyester filament yarn comprises a tenacity of about 65 cN/tex or greater and an Instantaneous Thermal Creep (ITC) at 100° C. of about 0.5% or less. Additional embodiments of the present invention include a woven fabric comprising a Hot Seam Combing Index (HSCI) of about 2 or less, and an airbag manufactured from any of these woven fabrics.

The polyester filament yarns used in the woven fabric of this invention can have an Instantaneous Thermal Creep (ITC) at 100° C. of about 0.5% or less, for example about 0.01% to about 0.5%. If the ITC of the polyester filaments is greater than 0.5%, on deployment, the creep of the yarn at the seam of airbags woven with this polyester yarn will be greater than that observed at the seam of comparable airbags woven with polyamide filament yarns.

The polyester filament yarns used in the woven fabric of this invention can have a tenacity of about 65 cN/tex or greater, for example a tenacity of about 65 cN/tex to about 100 cN/tex; a tenacity of about 75 or greater, for example a tenacity of about 75 cN/tex to about 100 cN/tex; or a tenacity of about 85 cN/tex or greater, for example a tenacity of about 85 cN/tex to about 100 cN/tex. Lower tenacity yarns require higher deniers to achieve the burst strength required for woven airbag fabrics resulting in thicker fabrics which are difficult to fold. The elongation of the polyester filament yarns used in the woven fabric of this invention can be about 12% or greater, for example from about 12% to about 20% or from about 12% to about 15%. The tensile index of the yarns can be about 240 or greater, for example from about 240 to about 450 or from about 240 to about 350. Higher yarn elongation will improve the energy absorption capability of the woven airbag fabric. However processes that give filament yarns with higher elongations are designed to provide yarn with an ITC at 100° C. of about 0.5% or less. The hot air shrinkage at 177° C. of the polyester filament yarn can be in the typical range of 3 to 20% for polyester industrial yarns.

The intrinsic viscosity (IV) of the polyester resin used to manufacture the polyester filament yarns used in the woven fabrics of this invention can be about 0.8 dl/g or greater. Polyester yarns with an IV of less than 0.8 dl/g do not give yarns with sufficient toughness.

Yarn linear densities can be about 250 dtex to about 700 dtex, depending on which type of air bag is required. The higher dtex yarns are woven into fabrics for the larger passenger air bags, compared to the lower dtex yarns for the side curtain. The filament in the yarns for the fabric can be non-round, flatter type filament. Typically the flatness of filaments is determined by the aspect ratio. The aspect ratio is the ratio of the length to the width of the filament (round cross-sections have an aspect ratio of 1.0). Suitable aspect ratios are in the range of about 1 to about 6. Flatter type filaments make the fabric less air permeable. However there is a practical limitation in that filaments beyond about a 6 aspect ratio do not provide any significant improvement and are more difficult to weave.

The decitex of the individual filament is typically in the range of 2 to 7. If the decitex/filament is less than about 2, control of the filament bundle in manufacturing becomes more difficult. If the decitex/filament is greater than about 7, the airbag fabric tends to be stiff and difficult to fold.

The polyester resin for forming the polyester multifilament yarns can be selected from the group consisting of polyethylene terephthalate, polybutylene terephthalate, polyethylene naphthalate, polybutylene naphthalate, polyethylene-1,2-bis(phenoxy)ethane-4,4'-dicarboxylate, poly (1,4cyclohexylene-dimethylene terephthalate and copolymers comprising at least one type of recurring units of the above-mentioned polymers, for example, polyethylene terephthalate/isophthalate copolyesters, polybutylene terephthalate/naphthalate copolyesters, polybutylene terephthalate/decanedicarboxylate copolyesters, and mixtures of two or more of the above-mentioned polymers and copolymers. Among them, polyethylene terephthalate resin is particularly suitable for the present invention, because this polymer is well balanced in mechanical properties and fiber-forming properties.

The polyester resin can be manufacture by the standard methods known to those skilled in the art. For example, a melt polymerization process providing amorphous polyester with an IV about 0.6, followed by a solid state polymerization process to the required resin IV. Minor amounts of other ingredients may also be present, generally comprising no more than 2% by weight based on the weight of the polyester homopolymer, such as processing aids like $TiO_2$, permanent yarn coatings that would reduce its coefficient of friction for example, or increase its adhesion to other substances such as rubbers, for example or to make it more UV stable, and less brittle.

The manufacturing processes for preparing the polyester filament yarns of this invention can include a continuous spin-draw process. For example, in a continuous spin-draw process, the molten filaments from the spinneret are quenched with air, lubricated and wrapped around a feed roll. The yarn then passes through a first and second draw zone and onto a relax roll and finally onto a winder. A heated zone can be used below the spinneret prior to the quench zone, and feed roll speeds in the range of 400 to 1000 meters/min. can be used. This low orientated and amorphous spun yarn is then drawn at least 5 times to maximize the strength before being relaxed. The feed and draw rolls are heated, and the relax roll can be optionally heated. It has been found that the temperature of the yarn in the relax zone between the second draw roll and relax roll, and the amount of relax in this zone has a large influence of the ITC of the final polyester filament yarn. The exact process details to produce polyester filament yarns of this invention will depend on the polymer resin IV, the specific spinning conditions, feed roll speeds, draw ratios, etc.

Airbag modules typically include a housing, and a folded airbag arranged in the housing and adapted to be inflated via a gas from an inflator. The housing has an opening for the deployment of the airbag.

In order to simulate the conditions during deployment of a woven airbag a hot seam test was developed. It was designed to study the seam of the woven fabric as it was heated under load. The stress on the yarns in a typical woven air bag (470 dtex yarns woven with a fabric thread count of 20 per cm) at the maximum airbag inflation pressure of 100 N per linear cm was calculated to be around 10 cN/tex.

Two pieces of woven fabric with warp and filling yarns aligned were overlaid and two parallel seams were stitched (5 stitches/cm) along the raw edges. The first seam was 12.5 mm from the raw edges and the second was 19 mm from the same edges. FIG. 1 illustrates the stitching pattern. Glass sewing thread (3300 dtex) was used so that only the hot fabric deformation could be observed.

Figure 2:
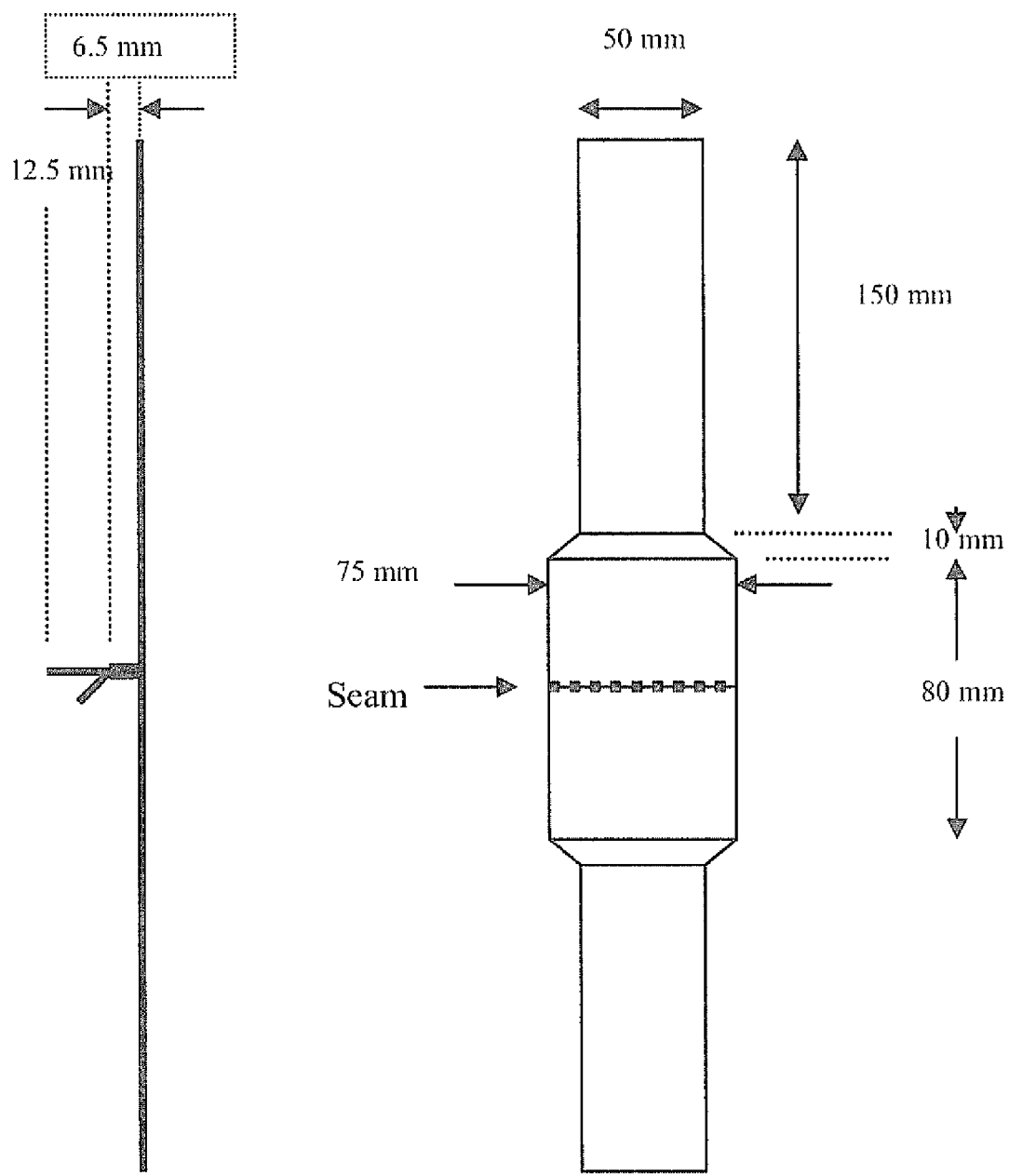
FIG. 2 illustrates the section of fabric test specimen used to measure the HSCI.

While the sewn fabrics were still one on top the other, a template was laid against the raw edge of the sewn fabrics and a test strip was marked and cut according to the following dimensions: beginning at the raw edge, a 59 mm length (in the filling yarn direction) and a width of 75 mm; the width of the strip then tapered from 75 mm to 50 mm over the next 10 mm length, and, finally, the width of the strip was 50 mm for the last 150 mm length. The cut fabric was then unfolded. FIG. 2 illustrates the front (200) and side (201) sections of the woven fabrics that were sewn together, marked with the template, cut into a test specimen, and then unfolded.

The upper end of the sewn strip was clamped to a fixed beam, and a load was applied to the lower end corresponding to a filament yarn stress of 10 cN/tex. A thermocouple was positioned in the seam. A hot air gun, at operating temperature, was rotated to be 10 cm from the seam. The seam was heated to 100° C. in 20 seconds, at which time the hot air gun was rotated away from the seam and the fabric allowed to cool to room temperature.

Before and after testing, photomicrographs of the seam were taken and analyzed. From these before and after testing photomicrographs, the average distance was measured between the seam and the second horizontal yarns on each side of the seam. The Hot Seam Combing Index (HSCI) is defined as the average distance between the seam and the second yarns after testing divided by the average distance between the seam and the second yarns before testing.

Two fabrics were woven using an INVISTA (Wilmington, Del. USA) T749 commercial 470 dtex nylon 66 filament warp, one fabric with the same T749 nylon 66 yarn as the filling, and the other with an INVISTA T791 490 dtex commercial polyester filament yarn as the filling yarn. Both the nylon and polyester filament yarns are sold for airbag applications. Using the test procedure described above, the HSCI of the fabric containing the T749 nylon filament yarn was 1.7, and that of the fabric containing the T791 polyester filling was 3.3.

In addition filaments were extracted from the seam comb area and a lower part of the sewn strip which had not been heated. The average diameter of these filaments was measured. The diameter of the filaments in the nylon fabric decreased slightly in the heated seam area (20.1 to 19.7 μm) compared to a much greater decrease in the polyester fabric (16.3 to 14.0 μm). It was therefore clear that the failure of polyester airbags was due to the hot stretching (creep) of the polyester yarns at the seams.

The filament yarns were characterized by their Instantaneous Thermal Creep (ITC). The ITC of the yarns was determined in such a manner as to simulate the heating and stress encountered during a hot module deployment. A Thermal Mechanical Analyzer (TA Instruments, model 2940) was used to record the dimensional change in length of the filaments under a controlled heating rate. A number of filaments were randomly selected from the filament yarn and combined into a bundle with a decitex of about 65. This bundle of filaments was mounted in the instrument, using a sample length of about 10 mm, and loaded to give a stress on the bundle of filaments of 8.83 cN/tex. The bundle was heated at 133.3° C./min. to a temperature of 100° C. The increase in length of the bundle was recorded when the temperature reaches 100° C. and the ITC is defined as the increase in length as a percentage of the original length.

Test Methods

1. Yarn Physical Properties

ASTM D885-02: Tenacity and elongation using a gauge length of 254 cm and a strain rate of 120%. Free Shrinkage (0.05 grams per denier load) was measured at 177° C. for 30 min.

Linear density (dtex) was measured using Option 1 of Test Method D 1907.

2. Yarn Intrinsic Viscosity (IV)

The relative viscosity (RV) of a 3% solution of the polyester in orthochlorophenol was measured at 25° C. using an Ubbelhode viscometer. The intrinsic viscosity (IV) was calculated from the following relationship:

$$RV = 1 + IV \times C + 0.305 \times IV^2 \times C^2 + 1.83 \times 10^{-5} \times \exp^{(4.5 \ast IV)} \times C^4$$

where C is the solution concentration in gm/100 ml.

3. Woven Fabric Construction

Unless otherwise stated the filament yarns were woven without twist in a plain weave with equal yarn density in both the warp and filling directions of about 18.5 yarns/cm. The greige fabric was scoured at 80° C. for 40 minutes in a jig and heat set at 185° C. for 2 minutes. This produces fabric with characteristics typical of other processes used in the conventional manufacture of airbag fabrics.

EXAMPLES

Comparative Example 1

Fabrics were prepared using INVISTA T749 470 dtex nylon filament yarn as the warp direction and with a variety of industrial polyester filament yarns developed for specific applications and nylon yarns designed for industrial fabrics as the filling direction. The ITC of the specimen filament yarns and the HSCI of the fabric containing the specimen yarns were measured. The general application field (these yarns are currently use in these industrial applications) and the physical properties of the yarns are set forth in Table 1. The corresponding yarn ITC and fabric HSCI are set forth in Table 2.

TABLE 1

| Polymer/Type | Application | Linear density, dtex | Tenacity, cN/tex | Elongation at break, % | Tensile Index | Hot Air Shrinkage, % |
|---|---|---|---|---|---|---|
| Nylon 66/725 | Industrial fabrics | 470 | 73 | 24.5 | 361 | 5.6 |
| Nylon 66/749 | Airbags | 470 | 81 | 25.3 | 407 | 6.4 |
| Polyester/781 | Airbags | 490 | 73 | 16.5 | 297 | 7 |
| Polyester/785 | Industrial webbing | 550 | 76 | 15 | 294 | 16 |
| Polyester/791 | Airbags | 490 | 70 | 24 | 343 | 3 |

TABLE 2

| Polymer | Type No. | HSCI | ITC @ 100° C., % |
|---|---|---|---|
| Nylon 66 | 725 | 1.9 | 0.3 |
| Nylon 66 | 749 | 1.7 | n.m. |
| Polyester | 781 | 2.3 | 1.3 |
| Polyester | 785 | 2.3 | 0.8 |
| Polyester | 791 | 3.3 | 2.0 | n.m.—not measured

An unacceptable degree of seam combing was evident in the polyester fabrics compared to the nylon fabrics.

Example 2

A series of polyester filament yarns with a nominal dtex of 550 and 100 filaments, and an aspect ratio of 1.0, were prepared according to the process conditions set forth in Table 3 below. Only the second draw roll temperature and relax ratio were varied between runs. The yarn physical properties of these yarns (IV of 0.90) are also set forth in Table 3.

TABLE 3

| Run No. | 1 | 2 | 3 | 4 | 5 | 6 |
|---|---|---|---|---|---|---|
| Process properties | | | | | | |
| Feed roll, mpm | 643 | 643 | 643 | 643 | 643 | 643 |
| Draw ratio | 5.53 | 5.53 | 5.53 | 5.53 | 5.53 | 5.53 |
| 2nd draw roll temp. ° C. | 210 | 210 | 225 | 225 | 240 | 240 |
| Relax roll temp. ° C. | 175 | 175 | 175 | 175 | 175 | 175 |
| Relax Ratio, % | 2 | 4 | 2 | 4 | 2 | 4 |
| Yarn properties | | | | | | |
| Tenacity, cN/tex | 80.3 | 82.1 | 79.4 | 80.3 | 80.3 | 75.9 |
| Elongation, % | 12.6 | 14.5 | 12.8 | 15.1 | 14.4 | 15.8 |
| Tensile Index | 285 | 313 | 284 | 312 | 305 | 302 |
| HAS @ 177° C., % | 14.8 | 12.4 | 11.3 | 9.4 | 9.2 | 10.0 |
| ITC @ 100° C., % | 0.31 | 0.83 | 0.49 | 0.70 | 0.63 | 0.93 |

Example 2 illustrates that the ITC of polyester filament yarns is very dependent on the process conditions. The process conditions for Run No. 1 and Run No. 3 produced polyester filament yarns having an ITC @ 100° C. of about 0.5% or less. The yarn of Run No. 1, having an ITC of 0.31%, is comparable to the Type 725 nylon 66 filament yarn that produced a woven fabric with a low HSCI (Table 2). A surprising aspect of the yarns of the present invention, having an ITC of less than about 0.5%, is that they are not the products with the highest energy absorption capability (tensile index).

Example 3

A 490 decitex polyester yarn was prepared according to the process of Example 2. The process conditions and yarn physical properties are set forth in Table 4.

TABLE 4

| Process Conditions | |
|---|---|
| Draw ratio | 5.37 |
| 2$^{nd}$ draw roll temperature, ° C. | 230 |
| Relax ratio, % | 0.5 |
| Yarn Physical Properties | |
| Tenacity, cN/tex | 77.2 |
| Elongation, % | 14.1 |
| Tensile Index | 285 |
| HAS @ 177° C., % | 9.4 |
| ITC @ 100° C. | 0.5 |

These filaments yarns were woven without twist in a plain weave with a yarn density in both the warp and filling direction of 20 yarns/cm. The greige fabric was scoured at 80° C. for 40 minutes in a jig and heat set at 185° C. for 2 minutes. Properties for the polyester fabric and a commercial Nylon 66 (INVISTA Type 725, 467 dtex) fabric are set forth in Table 5.

TABLE 5

| Properties | Polyester, Example 3 | Nylon |
|---|---|---|
| Fabric weight, g · m$^2$ | 215 | 214 |
| Thread count, yarns/cm. | 20 × 20 | 21 × 21 |
| Grab tensile strength, kg | 227 | 234 |
| Grab tensile elongation, % | 24 | 42 |
| Strip (2.54 cm) tensile strength, kg | 172 | 158 |
| Strip (2.54 cm) tensile elongation, % | 25 | 35 |
| Static Air permeability, cm$^3$ · s$^{-1}$/cm$^2$ | 178 | 211 |
| Trap tear, kg | 31 | 39 |
| Tongue Tear, kg | 10.9 | 12.4 |
| Mullen Burst Strength, MPa | 5.3 | 5.7 |

The polyester fabric was coated on both sides with 40 grams per square meter base-coat and 20 grams per square meter top-coat of silicone elastomer. The base-coat was General Electric SLE 5401 and the top-coat was Dow Coming 3714. The coatings were cured at approximately 190° C. After coating, a fabric sample was cut and the Hot Seam Combing Index was measured giving a value of 1.1. The seam showed no signs of distortion which could lead to gas leakage.

While the invention has been described in conjunction with specific embodiments thereof, it is evident that the many alternatives, modifications, and variations will be apparent to those skilled in the art in light of the foregoing description. Accordingly, the invention is intended to embrace all such alternatives, modifications and variations as fall within the spirit and scope of the claims.

What is claimed is:

1. A woven fabric comprising a polyester filament yarn, wherein said polyester filament yarn comprises a tenacity of about 65 cN/tex or greater and an Instantaneous Thermal Creep (ITC) at 100° C. of about 0.5% or less.

2. An airbag comprising the woven fabric of claim 1.

3. A polyester woven fabric comprising a hot seam combing index of about 2 or less.

4. An airbag comprising the woven fabric of claim 3.

5. The woven fabric of claim 1, wherein said polyester filament yarn further comprises an elongation of about 12% or greater.

6. The woven fabric of claim 1, wherein said polyester filament yarn further comprises a tensile index of about 240 or greater.

7. The woven fabric of claim 1, wherein said polyester filament yarn further comprises a linear density of from about 250 dtex to about 700 dtex.

8. The woven fabric of claim 1, wherein said polyester filament yarn further comprises an aspect ratio of from about 1 to about 6.

9. The woven fabric of claim 1, wherein said woven fabric further comprises a hot seam combing index of about 2 or less.

10. The woven fabric of claim 9, wherein said woven fabric is a plain weave comprising a yarn density in both the warp and filling directions of about 18 yarns/cm or greater.

11. The woven fabric of claim 9, wherein said woven fabric further comprises a cured coating of an elastomer applied at about 20 g/sq m to about 40 g/sq m.

12. The airbag of claim 2, wherein said woven fabric is sewn together with 2 rows of stitching and at least about 5 stitches per cm.

13. An airbag module comprising a housing, an inflator located within said housing, and an airbag, wherein said airbag comprises the woven fabric of claim 1.

14. The airbag module of claim 13, wherein said woven fabric further comprises a cured coating of silicone elastomer.

15. The woven fabric of claim 8, wherein said woven fabric further comprises a hot seam combing index of about 2 or less.

16. The airbag of claim 2, wherein said woven fabric further comprises a hot seam combing index of about 2 or less and said polyester filament yarn further comprises an aspect ratio of from about 1 to about 6.

17. The airbag module of claim 13, wherein said woven fabric further comprises a hot seam combing index of about 2 or less and said polyester filament yarn further comprises an aspect ratio of from about 1 to about 6.

* * * * *